United States Patent
Kobilka et al.

(10) Patent No.: US 11,059,960 B2
(45) Date of Patent: Jul. 13, 2021

(54) CROSS-LINKED IMPACT MODIFIED POLYPHOSPHAZENES

(71) Applicant: INTERNATIONAL BUSINESS MACHINES CORPORATION, Armonk, NY (US)

(72) Inventors: Brandon M. Kobilka, Tucson, AZ (US); Joseph Kuczynski, North Port, FL (US); Jacob T. Porter, Highland, NY (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 15/784,656

(22) Filed: Oct. 16, 2017

(65) Prior Publication Data

US 2019/0112457 A1 Apr. 18, 2019

(51) Int. Cl.
| | |
|---|---|
| *C08F 236/10* | (2006.01) |
| *C09K 21/14* | (2006.01) |
| *C08L 9/06* | (2006.01) |
| *C08C 19/24* | (2006.01) |
| *C08C 19/34* | (2006.01) |
| *C08C 19/22* | (2006.01) |

(52) U.S. Cl.
CPC ............ *C08L 9/06* (2013.01); *C08C 19/22* (2013.01); *C08C 19/24* (2013.01); *C08C 19/34* (2013.01); *C08F 236/10* (2013.01); *C09K 21/14* (2013.01); *C08F 2438/03* (2013.01); *C08L 2201/02* (2013.01); *C08L 2205/025* (2013.01)

(58) Field of Classification Search
CPC .... C08F 299/00; C08F 290/00; C08F 299/02; C08F 2438/03; C08F 236/10; C08G 79/00; C08G 79/02; C08L 9/06; C08L 2201/02; C08L 2205/025; C09K 21/14; C08C 19/34; C08C 19/24; C08C 19/22
See application file for complete search history.

(56) References Cited

U.S. PATENT DOCUMENTS

| | | | |
|---|---|---|---|
| 6,790,886 B2 | 9/2004 | Harashina et al. | |
| 7,060,744 B2 | 6/2006 | Murakami et al. | |
| 7,449,506 B2 | 11/2008 | Sato | |
| 8,313,771 B2 * | 11/2012 | Song | C08J 3/28 |
| | | | 424/486 |
| 2014/0150963 A1 | 6/2014 | He | |
| 2015/0307707 A1 | 10/2015 | Jung et al. | |
| 2016/0272812 A1 | 9/2016 | Zhou et al. | |

FOREIGN PATENT DOCUMENTS

| | | | |
|---|---|---|---|
| EP | 0279264 A2 | * | 8/1988 |
| JP | 53128700 A | * | 11/1978 |
| WO | 2016174592 A1 | | 11/2016 |

OTHER PUBLICATIONS

Lora, S. et al Biomaterials vol. 15(11) pp. 937-944 (1994).*
S. Rothemund et al., Preparation of Polyphosphazenes: A Tutorial Review, Chem. Soc. Rev., 2016, 45, 5200-5215.
D. Ratna, Epoxy Composites: Impact Resistance and Flame Retardancy, 2007, pp. 24-26.

* cited by examiner

*Primary Examiner* — Irina S Zemel
*Assistant Examiner* — Jeffrey S Lenihan
(74) *Attorney, Agent, or Firm* — Patterson + Sheridan, LLP

(57) ABSTRACT

A flame retardant composition and a method of making a flame retardant composition is provided. In an embodiment, the method includes reacting a phosphazene material with an acrylamide monomer material to form a functionalized phosphazene material; initiating a polymerization reaction on a reaction mixture comprising a functionalized phosphazene material and one or more monomers to form a first impact-modified phosphazene material; and reacting the first impact-modified phosphazene material with a poly(dichlorophosphazene) monomer material, and a reactant selected from the group consisting of $R^1OH$, $HNR^2R^3$, or a combination thereof, to form a second impact-modified phosphazene material.

18 Claims, 2 Drawing Sheets

CROSS-LINKED IMPACT MODIFIED POLYPHOSPHAZENES

FIELD OF THE DISCLOSURE

Materials and methods described herein relate to flame-retardant materials.

BACKGROUND

Plastic enclosures are ubiquitous in virtually all of today's electrical and electronic equipment (EEE). Although plastics can be readily injection molded into intricate, thin-walled structures, they also must meet important fire safety standards. Components in high-powered computers are highly concentrated heat sources that may result in rapid overheating and runaway thermal events. Electrical and electronic products are also subject to fire risks from electrical short circuits that can cause ignition within a product. Without the use of flame retardants to mitigate ignition resistance, the potential for fire danger increases as the number of electronic products—and cables, wires and electronic chargers to power them—increases in households, offices and commercial buildings.

Examples of flame retardants are phosphazenes and polyphosphazenes. Incorporating flame retardants into the materials used in electrical and electronic components enables manufacturers to meet fire safety standards (Such as UL 94, *Standard for Tests for Flammability of Plastic Materials for Parts in Devices and Appliances*), while also ensuring a product meets key technical requirements such as weight, durability, flexibility, and impact resistance. As new and more sophisticated material technologies emerge, and requirements for fire resistant materials evolve, the flame retardant itself must keep pace. Flame retardant manufacturers will continue to innovate and develop effective and sustainable flame retardants that meet new product demands for fire resistance, high performance and cost-effectiveness, and address environmental health and safety concerns.

Formulating plastic materials which meet not only flammability requirements, but key performance metrics (such as impact resistance), is an area of current research focus. Plastic manufacturers will often blend small molecule flame retardants into the base thermoplastic to render it ignition resistant. However, there is always a trade off in physical properties. That is, by increasing the loading level of the flame retardant (FR) to achieve a specific UL 94 rating, impact resistance is often degraded. The use of nano clay in conjunction with conventional flame retardants has been shown to minimize the detrimental effects of the FR on the polymer.

Thus, there is a need to compensate for degraded impact resistance while maintaining high levels of flame retardancy.

SUMMARY

Embodiments described herein relate to materials and methods of making flame retardant polymers.

According to one embodiment, a flame retardant composition is provided. The composition includes a phosphazene represented by formula

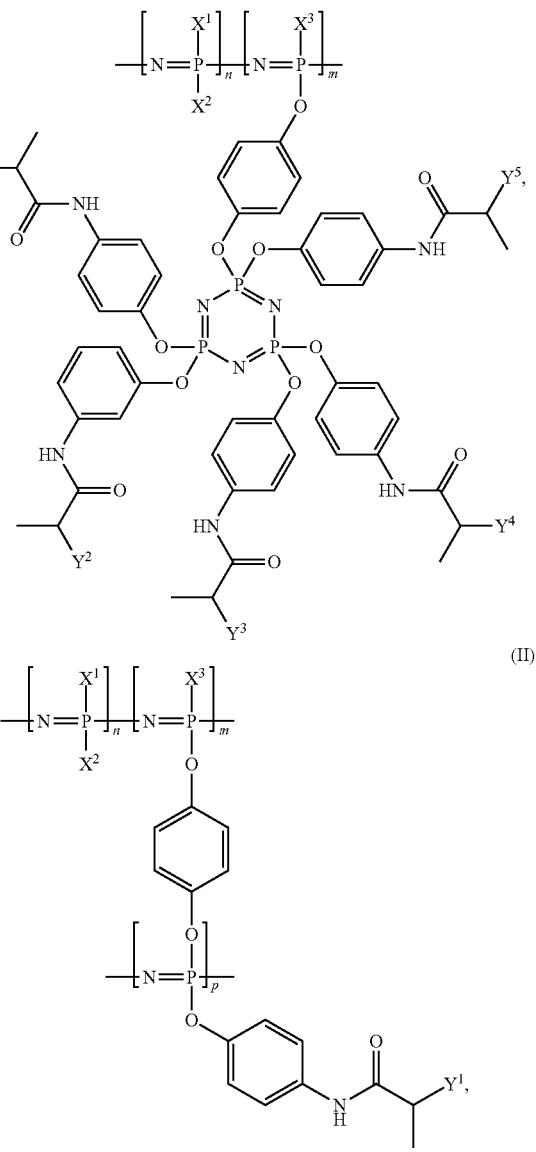

or a combination thereof,
wherein:
each of $Y^1$, $Y^2$, $Y^3$, $Y^4$, and $Y^5$ is independently a vinyl polymer;
each of $X^1$, $X^2$, and $X^3$ is independently an —$OR^1$ radical or an —$NR^2R^3$ radical, wherein $R^1$ is $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate; and each of $R^2$ and $R^3$ is independently hydrogen, $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate;
m is about 1-200;
n is about 1-200; and
p is about 1-100.

According to another embodiment, a method of forming an impact-modified phosphazene is provided. The method includes reacting a phosphazene material with an acrylamide monomer material to form a functionalized phosphazene material; and initiating a polymerization reaction on a reaction mixture comprising a functionalized phosphazene material and one or more monomers to form an impact-modified phosphazene material.

According to another embodiment, a method of forming an impact-modified phosphazene is provided. The method includes reacting a phosphazene material with an acrylamide monomer material to form a functionalized phosphazene material; initiating a polymerization reaction on a reaction mixture comprising a functionalized phosphazene material and one or more monomers to form a first impact-modified phosphazene material; and reacting the first impact-modified phosphazene material with a poly(dichlorophosphazene) monomer material, and a reactant selected from the group consisting of $R^1OH$, $HNR^2R^3$, or a combination thereof, wherein $R^1$ is $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate; and each of $R^2$ and $R^3$ is independently hydrogen, $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate, to form a second impact-modified phosphazene material.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, for the disclosure may admit to other equally effective embodiments.

DETAILED DESCRIPTION

Figure 1:
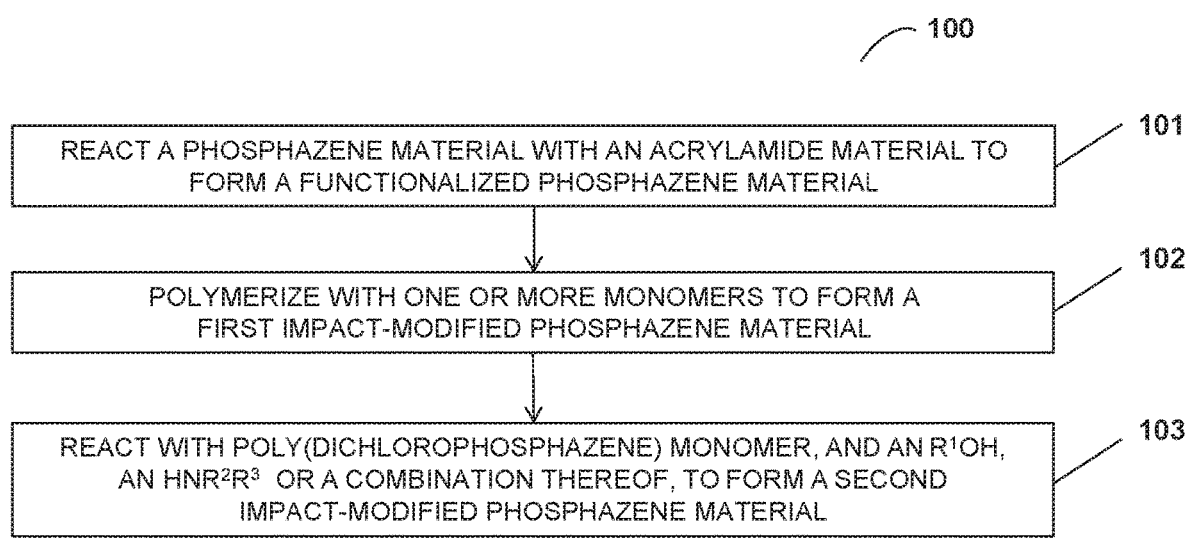
FIG. 1 shows a method of making an impact-modified phosphazene material according to an embodiment.

The present disclosure provides flame retardant compositions and methods of making such compositions involving polyphosphazenes. More particularly, the present disclosure provides for compositions and methods for making phosphazenes that incorporate both flame retardant and impact properties.

As disclosed herein, incorporating orthogonal functionality into a polymeric flame retardant allows the described compositions to minimize impact resistance caused by addition of flame retardants into the polymers. The flame retardant and impact resistant materials described herein may be directly blended with a base polymer or covalently bound to a base polymer rendering it both flame retardant and impact resistant.

This disclosure includes chemical structures that show atomic compositions of compounds and relative bonding arrangements of atoms in a chemical compound. Unless specifically stated, the geometric arrangement of atoms shown in the chemical structures is not intended to be an exact depiction of the geometric arrangement of every embodiment, and those skilled in the chemical arts will recognize that compounds may be similar to, or the same as, the illustrated compounds while having different molecular shapes or conformations. For example, the structures denoted herein may show bonds extending in one direction, while embodiments of the same compound may have the same bond extending in a different direction. Additionally, bond lengths and angles, Van der Waals interactions, isoelectronic structures, and the like may vary among instances of the same chemical compound. Additionally, unless otherwise noted, the disclosed structures cover all stereoisomers, conformers, rotamers, isomers, and enantiomers of the represented compounds.

Numbered chemical structures are numbered using numbers, or numbers and letters, in parentheses. Unless otherwise noted, chemical reactions are performed at ambient conditions or under slight heating with no special atmosphere or head space, and may be performed using standard organic solvents to manage mix properties such as viscosity and flow index.

Common routes to poly(organo)phospazenes use the precursor poly(dichloro)-phosphazene $[NPCl_2]_n$ 1. One route to polyphosphazenes, as shown in Scheme 1, is a stepwise, mixed substitution reaction of different nucleophiles (for example, primary alcohols, $R^1OH$ and $R^2OH$) proceeding through product 2, which is a poly(alkoxychloro)phosphazene. This reaction allows access to a broad range of copolymers such as phosphazene 3, which is a poly(alkoxy) phosphazene. Another mixed substitution reaction is a stepwise addition of different amines (for example, primary amines $R^1NH_2$ and $R^2NH_2$) proceeding through product 4, which is a poly(chloroalkylamino)phosphazene, to access a range of copolymers such as phosphazene 5. The amines may also be secondary amines. These mixed substitution reactions allow for fine-tuning of the polymer's properties.

Scheme 1:

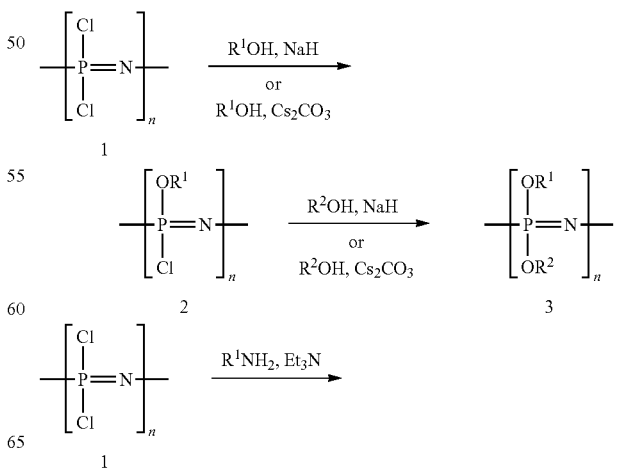

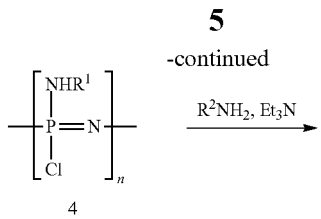

The compounds described above have flame-retardant properties typical of poly(phosphazenes) without further modification, but further functionality can be incorporated as described below to increase their flame retardant properties.

As used herein, "(flame-retardant,) impact-modified phosphazene material" includes cyclic phosphazene materials with or without additional flame-retardant components, and polyphosphazene materials with or without additional flame-retardant components.

As used herein, "PBS$^x$" means polybutadiene-styrene with an additional flame-retardant moiety (i.e., an organophosphate). As used herein, "PBS" means polybutadiene-styrene without an additional flame-retardant moiety (i.e., an organophosphate).

As used herein, "PG" means a protecting group.

As used herein, "vinyl polymer" includes polymers resulting from polymerization of monomers having carbon-carbon double bonds. Such polymers may include residual unsaturation. Polymer includes anything that has monomers, including oligomers.

In one set of embodiments, and as described below, mixed substituted aryloxy polyphosphazene compounds are formed. As shown herein, substituting a fraction of the R groups in Scheme 1 with, for example, an MBS-functionalized cyclotriphosphazene (where "MBS" stands for "methacrylate-butadiene-styrene") side group affords the ability to promote cross-linking. MBS is a co-polymer and is a well-documented impact modifier.

While all available sites of the cyclic phosphazenes, as described below, can be modified to incorporate desired functionality (for example, compounds 203, 301, and 401), it is also contemplated that only a few sites may be modified using stoichiometric reaction conditions to limit the number of functional groups. Thus, the mix of substituents can be changed and controlled using stoichiometry. You can starve this reaction of methacrylate to get PBS-only substituents, and you can starve the reaction of reagents altogether to get unsubstituted protected phenols.

According to an embodiment, and referring to Scheme 2, hexachlorocyclotriphosphazene (HCTP) 200 is transformed to phenoloxy-functionalized cyclotriphosphazene side group (PCSG) 203 by a stepwise, mixed substitution reaction using a sodium salt of 4-protected hydroxyl phenol 201 followed by p-methacrylamidophenoxide (generated in situ). Protecting groups for the 4-protected hydroxyl phenol include trialkylsilyl-, benzyl-, methoxy methyl-, tetrahydropyranyl-, among others. Synthetic routes to various mono-protected phenols 201 use standard solvent removal procedures and standard purification methods well known to those skilled in the art. An excess of HCTP can be used followed by extensive purification to yield the 4-(protected hydroxyl phenol) pentachlorotriphosphazene 202. p-Methacrylamidophenol is used in excess. Instead of using the p-methacrylamidophenol, analogous reactions can also be performed with methacrylatephenols or their sodium salts to give a methacrylate analogous to the methacrylamide.

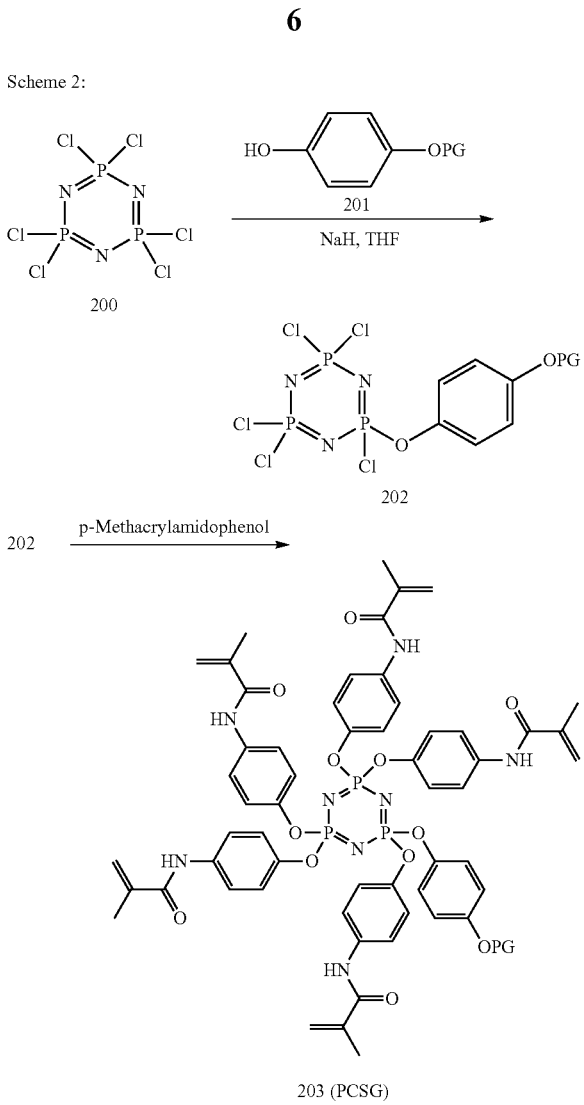

PCSG 203 is a cyclotriphosphazene with mixed methacrylatephenol and methacrylamidophenol substituents at the phosphate locations. PCSG 203 may have all methacrylatephenol substituents, all methacrylamidophenol substituents, or any mixture thereof according to the stoichiometry employed in Scheme 2.

The synthesis of PCSG 203, with only methacrylamidophenol substituents, may be performed by the following prophetic process. To a stirred solution of molecule 202 (1.0 eq.) and p-methacrylamidophenol in anhydrous THF or dioxane at 40° C. under argon, is added a base which may include potassium carbonate, cesium carbonate, or sodium hydride. The base is added portion-wise and the reaction mixture is stirred for about 15 minutes, followed by heating to 60° C. or reflux for a period of 24 hours. Upon completion, the reaction is mixed with water, and the layers separated. The aqueous layer is extracted with diethyl ether or ethyl acetate several times. The organic layers are combined and washed with ammonium chloride and/or brine and dried over magnesium sulfate. The solvents may be removed in vacuo and the crude product may be purified by recrystallization or column chromatography.

Methacrylatephenol may be mixed with, or substituted for, p-methacrylamidophenol to make the PCSG 203 with methacrylatephenol substituents. It should be further noted that other acrylatephenols and/or acrylamidophenols may be used in Scheme 2 to yield analogous PCSG-substituted cyclotriphosphazenes. Moreover, any material that can undergo polymerization is contemplated, such as styrene-based materials, butadiene-styrene-based materials, or other vinyl materials may be used. Furthermore, vinyl-terminated oligomers, xylenols, and preformed polymer blocks can be used. Other compounds of interest include dimethyl amino styrenes, p-methoxy styrenes, p-methyl styrenes, alpha-methyl styrenes, isoprenes, vinyl naphthalenes, p-chlorostyrenes, vinyl pyridines, diphenyl ethylenes, alkyl methacrylates, propiolactones, propylene sulfides, vinylidene cyanides, and alpha-cyanoacrylates.

Schemes 3-5, as illustrated below, detail the copolymerization of PCSG with a mixture of styrene, butadiene, and typically nominal amounts of a phosphorus-containing acrylate via Reversible Addition-Fragmentation chain Transfer (RAFT) polymerization to give poly(methyl methacrylate-co-butadiene-co-styrene)-functionalized PCSG (MBS-PCSG). The optional, additional flame retardant group provides an additional synergistic flame retardancy when used. Common radical polymerization techniques using thermal initiators, UV initiators, controlled radical polymerization, and the like are suitable.

According to an embodiment, and referring to Scheme 3, a poly(methacrylate-co-butadiene-co-styrene)-functionalized PCSG (MBS-PCSG-1, 301) is formed by a polymerization of PCSG with styrene and butadiene by one of the known radical polymerization techniques listed above. $PBS^x$ is a polybutadiene-styrene without an additional flame-retardant moiety, where x is about 1-12,500, and y is about 1-12,500, preferably, x is about 100-12,500, and y is about 100-12,500.

Scheme 3:

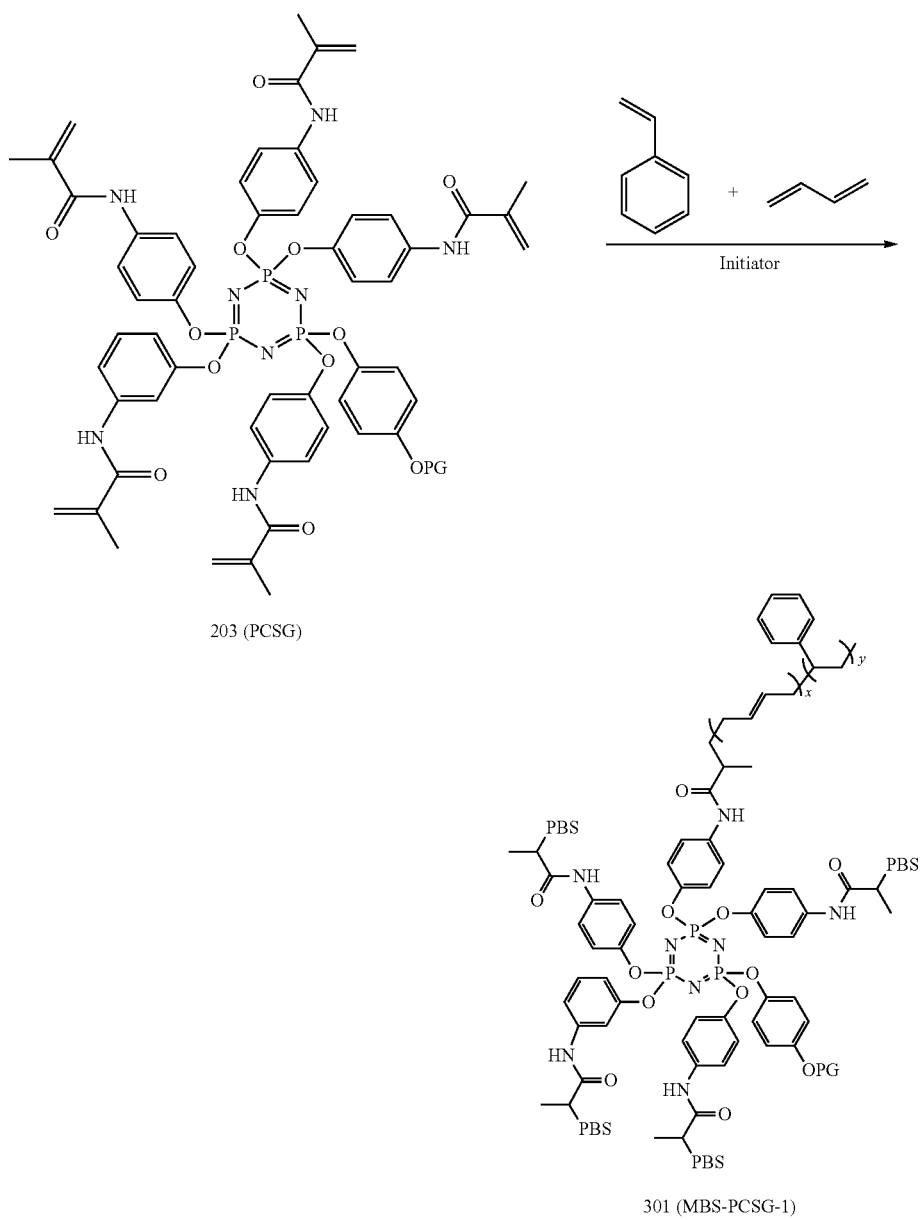

PBS = 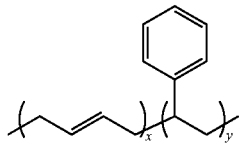

The reaction may be performed by the following process. To bulk quantity or a stirred solution of PCSG 203 in an organic solvent such as benzene is added an initiator such as 2,2'-Azobis(2-methylpropionitrile) (AIBN), 4,4'-azobis(4-cyanovaleric acid) (ACVA), or benzoyl peroxide (0.05-0.5 mol %), a RAFT agent such as 2-cyano-2-propyl benzodithioate or 4-cyano-4-[(dodecylsulfanylthiocarbonyl)sulfanyl]pentanoic acid (0.05-0.5 mol %), excess styrene, and excess polybutadiene in an anhydrous solvent such as benzene degassed by three freeze-pump-thaw cycles. The mixture is heated with stirring at about 60° C. for about 4 to about 24 hours, and may be precipitated into a non-solvent such as hexane or methanol and purified techniques such as re-precipitation or Soxhlet extraction.

Other initiators that can be used for the processes described herein include azo initiators such as 4,4'-azobis(4-cyanovaleric acid), 1,1'-azobis(cyclohexanecarbonitrile), azobisisobutyronitrile 12 wt. % in acetone, 2,2'-azobis(2-methylpropionamidine) dihydrochloride granular, and 2,2'-azobis(2-methylpropionitrile), and 2,2'-azobis(2-methylpropionitrile). Such azo initiators are commercially available from Sigma Aldrich.

Other peroxides that can be used for the processes described herein include di-tert-butyl peroxide (DTBP), tert-butyl hydroperoxide, tert-butyl peracetate, cumene hydroperoxide, 2,5-di(tert-butylperoxy)-2,5-dimethyl-3-hexyne, 2,5-di(tert-butylperoxy)-2,5-dimethyl-3-hexyne, dicumyl peroxide, 2,5-bis(tert-butylperoxy)-2,5-dimethylhexane, 2,4-pentanedione peroxide, 1,1-bis(tert-butylperoxy)-3,3,5-trimethylcyclohexane, 1,1-bis(tert-butylperoxy)cyclohexane, 1,1-bis(tert-amylperoxy)cyclohexane, benzoyl peroxide, 2-butanone peroxide, 2-butanone peroxide, tert-butyl peroxide, lauroyl peroxide, tert-butyl peroxybenzoate, and tert-butylperoxy 2-ethylhexyl carbonate. These agents may be in solution with other agents or combined with solvents stabilizers, plasticizers, calcium carbonate and/or silica.

RAFT agents may be selected according to monomer class, transfer constant, hydrolytic stability, among other factors. Common RAFT agents include trithiocarbonates, dithiocarbamates, dithiobenzoates, switchable RAFT agents, and macro-RAFT agents.

Other RAFT agents that can be used for the processes described herein include specifically, trithiocarbonates: such as 3,5-bis(2-dodecylthiocarbonothioylthio-1-oxopropoxy)benzoic acid, 3-Butenyl 2-(dodecylthiocarbonothioylthio)-2-methylpropionate, 2-(2-carboxyethyl sulfanylthiocarbonyl sulfanyl)propionic acid, 4-((((2-carboxyethyl)thio)carbonothioyl)thio)-4-cyanopentanoic acid, 2-cyanobutan-2-yl 4-chloro-3,5-dimethyl-1H-pyrazole-1-carbodithioate, 2-cyanobutanyl-2-yl 3,5-dimethyl-1H-pyrazole-1-carbodithioate, 4-cyano-4-[(dodecylsulfanylthiocarbonyl)sulfanyl]pentanoic acid, 4-cyano-4-[(dodecyl sulfanylthiocarbonyl)sulfanyl]pentanol, cyanomethyl (3,5-dimethyl-1H-pyrazole)-carbodithioate, cyanomethyl dodecyl trithiocarbonate, cyanomethyl [3-(trimethoxysilyl)propyl] trithiocarbonate, 2-cyano-2-propyl dodecyl trithiocarbonate, S,S-dibenzyl trithiocarbonate, 2-(dodecylthiocarbonothioylthio)-2-methylpropionic acid, 2-(dodecylthiocarbonothioylthio)-2-methylpropionic acid 3-azido-1-propanol ester, 2-(dodecylthiocarbonothioylthio)-2-methylpropionic acid N-hydroxysuccinimide ester, 2-(dodecylthiocarbonothioylthio)-2-methylpropionic acid pentafluorophenyl ester, 2-(dodecylthiocarbonothioylthio)propionic acid, methyl 2-(dodecylthiocarbonothioylthio)-2-methylpropanoate, pentaerythritol tetrakis[2-(dodecylthiocarbonothioylthio)-2-methylpropionate], phthalimidomethyl butyl trithiocarbonate, poly(acrylic acid), DDMAT terminated average $M_n$ 10,000, PDI ≤1.1, poly(ethylene glycol) bis[2-(dodecylthiocarbonothioylthio)-2-methylpropionate] average $M_n$ 10,800, poly(ethylene glycol) methyl ether 4-cyano-4-[(dodecyl sulfanylthiocarbonyl)sulfanyl]pentanoate average $M_n$ 10,000, poly(ethylene glycol) methyl ether (4-cyano-4-pentanoate dodecyl trithiocarbonate) average $M_n$ 5,400, poly(ethylene glycol) methyl ether (4-cyano-4-pentanoate dodecyl trithiocarbonate) average $M_n$ 2,400, poly(ethylene glycol) methyl ether (4-cyano-4-pentanoate dodecyl trithiocarbonate) average $M_n$ 1,400, poly(ethylene glycol) methyl ether 2-(dodecylthiocarbonothioylthio)-2-methylpropionate average $M_n$ 5,000, poly(ethylene glycol) methyl ether 2-(dodecylthiocarbonothioylthio)-2-methylpropionate average $M_n$ 1,100, poly(ethylene glycol) methyl ether (2-methyl-2-propionic acid dodecyl trithiocarbonate) average $M_n$ 10,000, poly(L-lactide) 4-cyano-4-[(dodecyl sulfanylthiocarbonyl)sulfanyl]pentonate, poly(L-lactide) 4-cyano-4-[(dodecylsulfanylthiocarbonyl)sulfanyl]pentonate $M_n$ 10,000, PDI ≤1.2, poly(D,L-lactide), 4-cyano-4-[(dodecylsulfanylthiocarbonyl)sulfanyl]pentonate terminated average $M_n$ 5000, PDI ≤1.5, polystyrene, DDMAT terminated average $M_n$10,000, PDI ≤1.1, and 1,1,1-tris[(dodecylthiocarbonothioylthio)-2-methylpropionate]ethane; dithiocarbamates: such as benzyl 1H-pyrrole-1-carbodithioate, cyanomethyl diphenylcarbamodithioate, cyanomethyl methyl(phenyl)carbamodithioate, cyanomethyl methyl(4-pyridyl)carbamodithioate, 2-cyanopropan-2-yl N-methyl-N-(pyridin-4-yl)carbamodithioate, methyl 2-[methyl(4-pyridinyl)carbamothioylthio]

propionate, and 1-succinimidyl-4-cyano-4-[N-methyl-N-(4-pyridyl)caramothioylthio]pentanoate; dithiobenzoates: such as benzyl benzodithioate, cyanomethyl benzodithioate, 4-cyano-4-(phenylcarbonothioylthio)pentanoic acid, 4-cyano-4-(phenylcarbonothioylthio)pentanoic acid N-succinimidyl ester, 2-cyano-2-propyl benzodithioate, 2-cyano-2-propyl 4-cyanobenzodithioate, ethyl 2-(4-methoxyphenylcarbonothioylthio)acetate, ethyl 2-methyl-2-(phenylthiocarbonylthio)propionate, ethyl 2-(phenylcarbonothioylthio)-2-phenylacetate, ethyl 2-(phenylcarbonothioylthio)propionate, 1-(methoxycarbonyl)ethyl benzodithioate, 2-(4-methoxyphenylcarbonothioylthio)ethanoic acid, 2-nitro-5-(2-propynyloxy)benzyl 4-cyano-4-(phenylcarbonothioylthio)pentanoate, 2-(phenylcarbonothioylthio)propanoic acid, and 2-phenyl-2-propyl benzodithioate; switchable RAFT agents: such as cyanomethyl methyl(4-pyridyl) carbamodithioate, 2-cyanopropan-2-yl N-methyl-N-(pyridin-4-yl)carbamodithioate, methyl 2-[methyl(4-pyridinyl)carbamothioylthio]propionate, and 1-succinimidyl-4-cyano-4-[N-methyl-N-(4-pyridyl)carbamothioylthio]pentanoate; and macro-RAFT agents: such as poly(acrylic acid), DDMAT terminated average Mn 10,000, PDI ≤1.1, poly(tert-butyl acrylate), DDMAT terminated, azide terminated average Mn 8,500, PDI ≤1.2, poly(tert-butyl acrylate), DDMAT terminated average Mn 7,000, poly(N,N-dimethylacrylamide), DDMAT terminated average Mn 10,000, PDI ≤1.1, poly(ethylene glycol) bis[2-(dodecylthiocarbonothioylthio)-2-methylpropionate] average Mn 10,800, poly(ethylene glycol) 4-cyano-4-(phenylcarbonothioylthio)pentanoate average Mn 10,000, poly(ethylene glycol) 4-cyano-4-(phenylcarbonothioylthio) pentanoate average Mn 2,000, poly(ethylene glycol) methyl ether 4-cyano-4-[(dodecylsulfanylthiocarbonyl)sulfanyl] pentanoate average Mn 10,000, poly(ethylene glycol) methyl ether (4-cyano-4-pentanoate dodecyl trithiocarbonate) average Mn 5,400, poly(ethylene glycol) methyl ether (4-cyano-4-pentanoate dodecyl trithiocarbonate) average Mn 2,400, poly(ethylene glycol) methyl ether (4-cyano-4-pentanoate dodecyl trithiocarbonate) average Mn 1,400, poly(ethylene glycol) methyl ether 2-(dodecylthiocarbonothioylthio)-2-methylpropionate average Mn 5,000, poly(ethylene glycol) methyl ether 2-(dodecylthiocarbonothioylthio)-2-methylpropionate average Mn 1,100, poly(ethylene glycol) methyl ether (2-methyl-2-propionic acid dodecyl trithiocarbonate) average Mn 10,000, Poly(hydroxyethyl methacrylate), DDMAT terminated average Mn 7,000, PDI <1.2, Poly(D,L-lactide), 4-cyano-4-[(dodecylsulfanylthiocarbonyl)sulfanyl]pentonate terminated average Mn 20,000, PDI <1.4, poly(D,L-lactide), 4-cyano-4-[(dodecylsulfanylthiocarbonyl)sulfanyl]pentonate terminated average Mn 10,000, PDI <1.4, polystyrene, DDMAT terminated average Mn 10,000, PDI ≤1.1, and polystyrene, DDMAT terminated average Mn 5,000, PDI <1.1. Such RAFT agents are commercially available from Sigma Aldrich.

According to an embodiment, and referring to Scheme 4A, a poly(methacrylate-co-butadiene-co-styrene)-functionalized PCSG (MB S-PCSG-2, 401) is formed by a polymerization of PCSG 203 with styrene, butadiene, and 2-((diphenylphosphoryl)oxy)ethyl methacrylate 400 by one of the known radical polymerization techniques listed above. PBS[2] is a polybutadiene-styrene, where x is about 1-12,500, y is about 1-12,500, and z is about 1-12,500, preferably, x is about 100-12,500, and y is about 100-12,500, and z is about 100-12,500.

Scheme 4A:

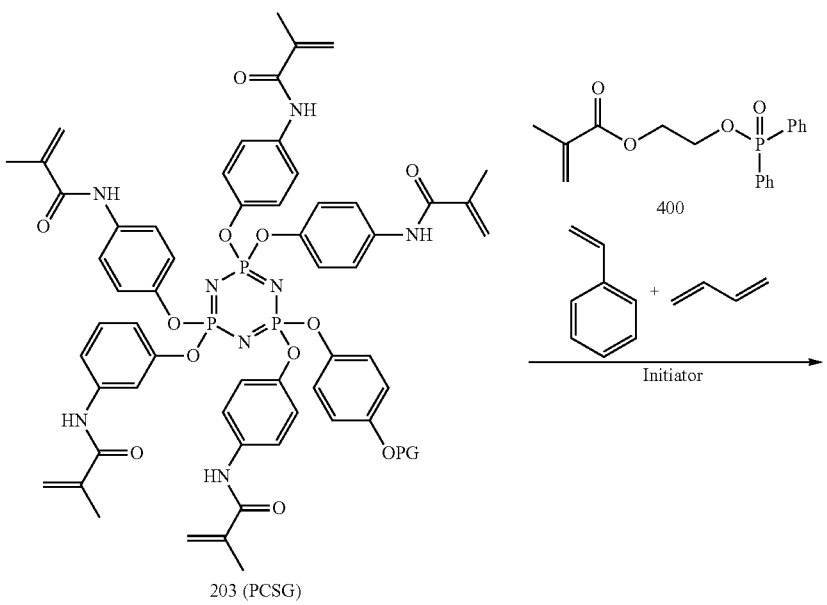

203 (PCSG)

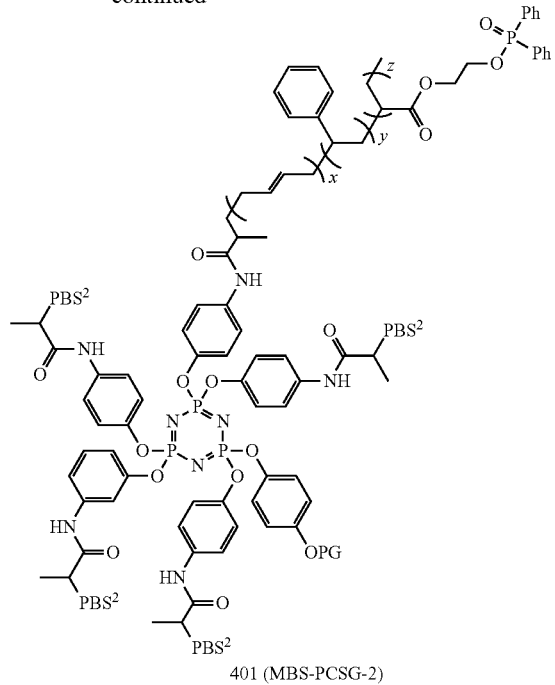

401 (MBS-PCSG-2)

PBS² =

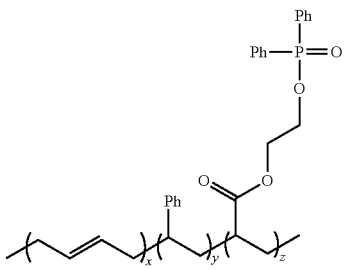

The synthesis of MBS-PCSG-2, 401, may be performed in an analogous procedure to the synthesis of MBS-PCSG-1, 301. Other RAFT agents, azo initiators and peroxides described herein can be used for the process.

In an embodiment, and as shown in Scheme 4B, the phosphorous functionalized acrylate monomer 400 is synthesized from 2-hydroxyethyl methacrylate 402, available from Sigma-Aldrich. The synthesis uses a phosphorous reactant such as diphenylphosphinic chloride 403A or diphenylphosphoryl chloride 403B with trimethylamine (Et₃N), 4- and dimethylaminopyridine (DMAP) as catalyst, in dichloromethane (DCM) to provide monomer 400. Triethylamine (1.2 equiv.) and N,N-dimethylaminopyridine (DMAP) (3.0 mol %) is added to a stirred solution of 2-hydroxymethyacrylate (1.0 equiv.) in 150 mL of DCM, under argon, and cooled to 0° C. A solution of diphenylphosphoryl chloride or diphenylphosphinic chloride in DCM (1.1 equiv.) is added dropwise at 0° C. Upon completion of the addition, the reaction mixture is allowed stir for 1 hour at 0° C., is warmed to room temperature and stirred for 16 hours. The reaction mixture is subsequently washed about twice with water, followed by 1N HCl, about three additional washes of water, and brine. The organic layer is dried over anhydrous sodium sulfate, filtered, and the solvents removed in vacuo. The product may be purified by fractional distillation.

Scheme 4B:

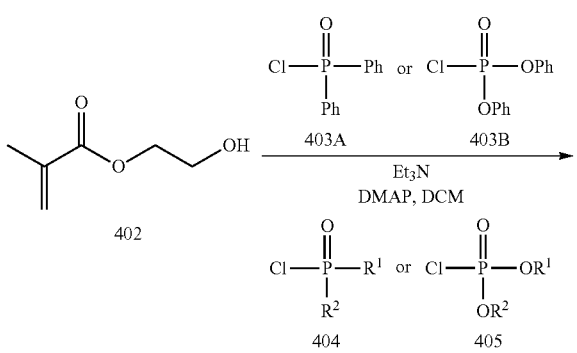

$R^1$, $R^2$ = alkyl, aryl

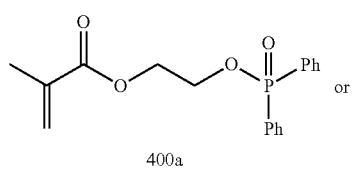

400a

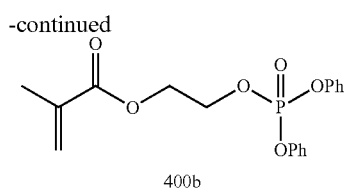

400b

Other phosphorous based molecules can be used for the synthesis of the phosphorous functionalized acrylate monomers. As shown in Scheme 4B, such phosphorous based molecules include phosphorous reactants 404 and 405 where each of $R^1$ and $R^2$ is independently alkyl or aryl. These alkyl and aryl groups may be branched or unbranched, substituted or unsubstituted. This allows for an expanded class of molecules similar to MBS-PCSG-2 (401) to be synthesized with $R^1$ and $R^2$ replacing some or all of the phenyl groups. It is contemplated that any suitable phosphorous reactant may be utilized to prepare the flame retardant and impact resistant phosphazenes.

According to an embodiment, and referring to Scheme 5A, a poly(methacrylate-co-butadiene-co-styrene)-functionalized PCSG (MBS-PCSG-3, 501) is formed by a polymerization of PCSG 203 with styrene, butadiene, and 4-(diphenylphosphino)styrene 500 by one of the known radical polymerization techniques listed above. 4-(diphenylphosphino)styrene is commercially available from Sigma-Aldrich. $PBS^3$ is a polybutadiene-styrene, where x is about 1-12,500, y is about 1-12,500, and z is about 1-12,500, preferably, x is about 100-12,500, and y is about 100-12,500, and z is about 100-12,500.

Scheme 5A:

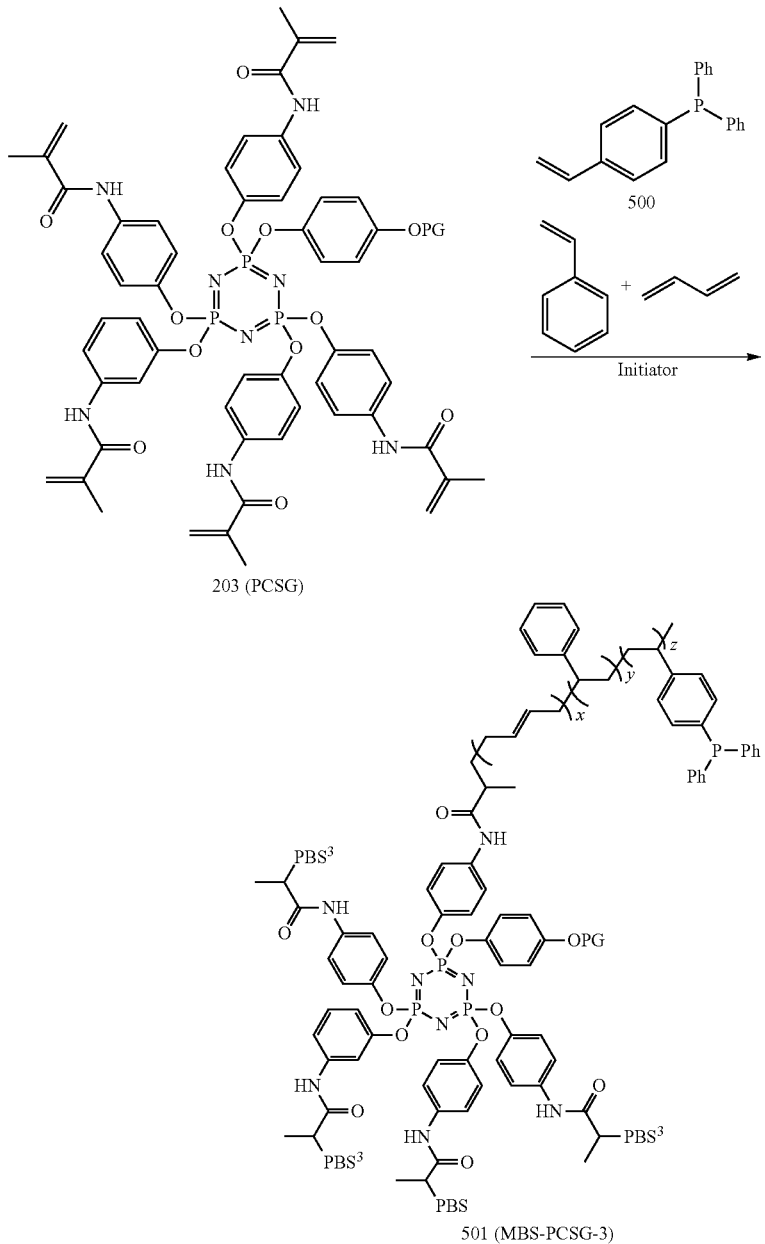

PBS³ = 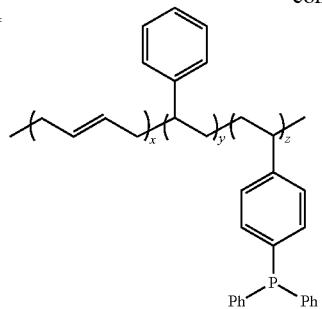

The synthesis of MBS-PCSG-3, 501, may be performed in an analogous procedure to the synthesis of MBS-PCSG-1, 301. Other RAFT agents, azo initiators and peroxides described herein can be used for the process.

In an embodiment, and as shown in Scheme 5B, diphenyl styrenyl phosphine 500 can be substituted with other phosphorous-functionalized styrene monomers, including styrenyl phosphine oxide 502, styrenyl phosphonate 503, styrenyl phosphate 504, and styrenyl phosphinate 505. In each of compounds 502-505, each of $R^1$ and $R^2$ is independently alkyl or aryl. These alkyl and aryl groups may be branched or unbranched, substituted or unsubstituted. Schemes 5C, 5D, and 5E illustrate the syntheses of 502-505 from commercially available starting materials and reagents.

Scheme 5B:

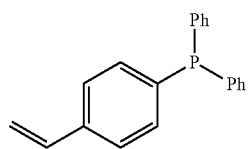
500

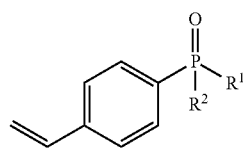
502

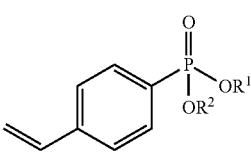
503

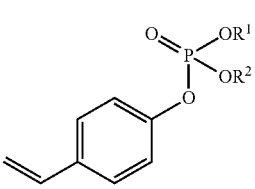
504

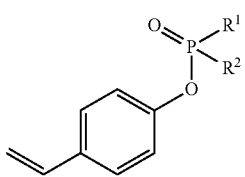
505

$R^1, R^2$ = alkyl, aryl

In an embodiment, and as shown in Scheme 5C, a styrenyl phosphine oxide 502 ($R^1, R^2$=phenyl) as a non-limiting example is synthesized from a styrenyl phosphine 500 ($R^1, R^2$=phenyl) by reaction with oxone (potassium peroxymonosulfate), $H_2O$, methanol (MeOH), and 1,1-dichloroethane ($C_2H_4Cl_2$). p-Styryldiphenyl phosphine (1.0 equiv.) and 1,2-dichloroethane (0.2 M) is added to a round-bottom flask. Saturated aqueous solutions of oxone (2.0 equiv.) and methanol (20% v/v) is added to the reaction flask and the mixture is stirred for 2 h. The reaction mixture and a large excess of water is added to a separatory funnel, and the two layers separated. The organic layer is retained and the solvent removed in vacuo. The sticky solid is washed with cyclohexane and then filtered.

Scheme 5C:

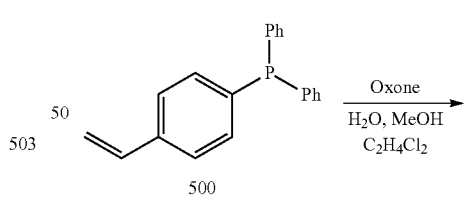
500
$R^1, R^2$ = phenyl

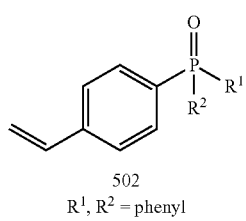
502
$R^1, R^2$ = phenyl

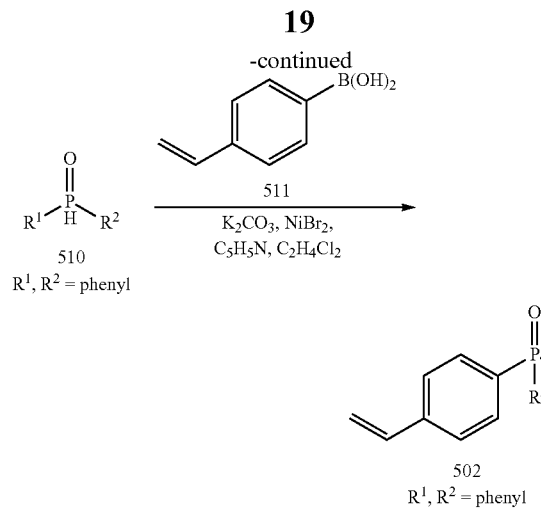

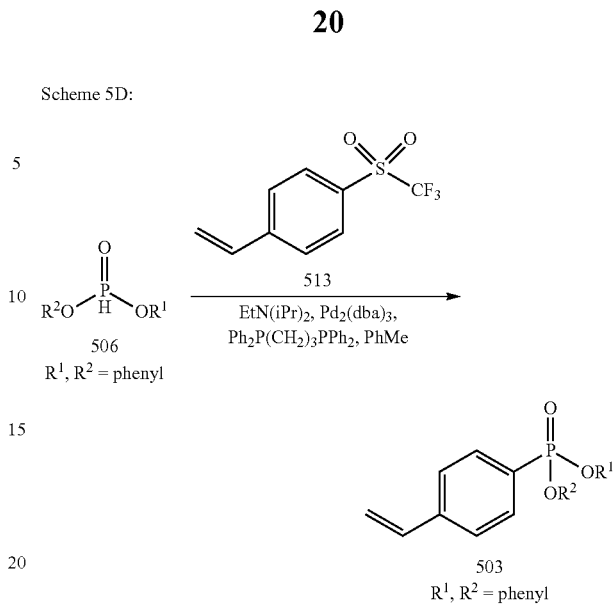

Alternatively, the reaction as shown in Scheme 5C may be accomplished by the following procedure. Diphenylphosphine oxide 510 (1 equiv.), 4-styryl boronic acid 511 (1.5 equiv.), NiBr$_2$ (1 mol %) and pyridine (2-8 mol %) or 2,2-bipyridyl (1-4 mol %), and K$_2$CO$_3$ (2 equiv) is dissolved in 1,2-dichloroethane and stirred at 100° C. for 24 h under an argon atmosphere (under air for 2,2-bipyridyl). The resulting mixture may be purified by, for example, silica gel chromatography using a mixture of petroleum ether and ethyl acetate as eluent. Standard procedures for solvent removal can then be performed to provide the styrenyl phosphine oxide 502 (R$^1$, R$^2$=phenyl).

In another embodiment, and as shown in Scheme 5D, a styrenyl phosphonate 503 as a non-limiting example is synthesized from a phosphoric ester 506 (R$^1$, R$^2$=phenyl) by the following procedure. A solution of p-styryl triflate 513 (1.0 equiv) (which may be synthesized by stirring a DCM solution of 4-vinylphenol with triflic anhydride in the presence of pyridine at 0° C.), diphenyl phosphonate 506 (1.2 equiv), N,N-diisopropylethylamine (1.5 equiv), Tris(dibenzylideneacetone)dipalladium(0) (Pd$_2$(dba)$_3$) (5 mol %), and 1,3-bis(diphenylphosphino)propane (Ph$_2$P(CH$_2$)$_3$PPh$_2$) (5 mol %) in toluene (PhMe), under argon, is stirred at 110° C. for 40 h. The mixture is cooled to room temperature and filtered through celite. The solution is concentrated, and purified by column chromatography on silica gel. Standard procedures for solvent removal can then be performed to provide the styrenyl phosphonate 503 (R$^1$, R$^2$=phenyl).

In another embodiment, and as shown in Scheme 5E, styrenyl phosphates 504 can be synthesized from 4-vinylphenol 507 using phosphoric esters 506 (R$^1$, R$^2$=alkyl, aryl), and lithium tert-butoxide (LiOtBu), in a solution of carbon tetrachloride (CCl$_4$). As a non-limiting example, phosphoric ester 506 (R$^1$, R$^2$=phenyl) is used as a starting material. A reaction vessel, such as a Schlenk tube, is charged with diphenylphosphine oxide (2.0 equiv.), 4-vinylphenol (1.0 equiv.), lithium tert-butoxide (2.0 equiv.) and CHCl$_3$ (1 M), under an inert atmosphere. The mixture is stirred at room temperature for 30 minutes, and the volatiles removed in vacuo. The product may be purified from the crude mixture by, for example, being passed through a pad or column of silica gel using petroleum ether/ethyl acetate (5:1) as the eluent. Standard procedures for solvent removal can then be performed to provide the styrenyl phosphate 504 (R$^1$, R$^2$=phenyl).

Scheme 5E:

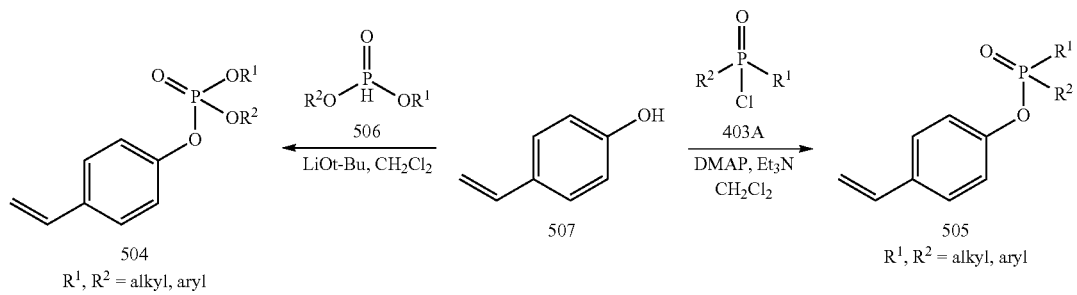

Styrenyl phosphinates 505 (R$^1$, R$^2$=Ph) may be synthesized from 4-vinylphenol 507 using chlorides 403A (R$^1$, R$^2$=alkyl, aryl) and DMAP in a solution of dichloromethane. As a non-limiting example, chloride 403A (R$^1$, R$^2$=phenyl) is used as a starting material. Triethylamine (1.2 equiv.) and N,N-dimethylaminopyridine (DMAP) (3.0 mol %) is added to a stirred solution of 4-vinylphenol (1.0 equiv.) in 150 mL of dichloromethane (CH$_2$Cl$_2$, DCM), under argon, and cooled to 0° C. A solution of diphenyl chlorophosphate (1.1 equiv.) in DCM is added dropwise at 0° C. Upon completion of the addition, the reaction mixture is allowed stir for 1 hour at 0° C., and is warmed to room temperature and stirred for 16 hours. The reaction mixture is subsequently washed about twice with water, followed by 1N HCl, about three additional washes of water, and brine. The organic layer is dried over anhydrous sodium sulfate, filtered, and the solvents removed in vacuo. The product may be purified by fractional distillation to provide the styrenyl phosphinate 505 (R$^1$, R$^2$=phenyl).

According to an embodiment, Scheme 6 shows the synthesis of a cross-linked impact-modified polyphosphazene material. In the first operation, the protecting groups of the various MBS-PCSGs 600 are removed by standard procedures known to those skilled in the art. Standard procedures for solvent removal and purification are then performed to provide the phenol of the MBS-PCSGs (not shown). For example, if the protecting group (PG) is a trialkylsilyl such as trimethylsilyl or tert-butylsilyl, TBAF can be used. The resultant phenols are reacted with poly(dichlorophosphazene) (601) and other alcohols (R$^1$OH) and/or amines (HNR$^2$R$^3$). The amine can be primary or secondary. The poly(dichlorophosphazene) is dissolved in tetrahydrofuran (THF) and reacted with the sodium salt of the desired hydroxyl-fucntionalized moiety, by dropwise additions of the salt solution in a molar percentage equivalent to the desired substitution molar percentage. The sodium salt solution may be generated by, for example, reacting the desired hydroxyl moiety with sodium hydride in THF under anhydrous conditions. Additional sodium salt of hydroxyl moieties may be added subsequently to the reaction mixture to further substitute the poly(dichlorphosphazene) depending on the desired product. The reaction mixture is stirred up to a period of about 24-72 hours or for additional about 2 hour periods with additional hydroxyl moieties. The reaction mixture is concentrated in vacuo, precipitated into water, and the resulting crude solid is dialyzed with 20% (v/v) methanol in acetone. The solid may be precipitated once more into water and dried in vacuo. This yields a polyphosphazene with a mixture of "inert" or "property-determining" side groups and cyclotriphosphazene side groups affixed along the main chain. Various side groups, in the form of functionalized hydroxyl moieties may be added to the polyphosphazenes by controlling the ratios and order of addition during this step. The ratio of these various side groups can be used to control the polymer's physical and mechanical properties. These hydroxyl moieties can have functionality that is cross-linkable or does not react. Upon heating, the cyclotriphosphazene groups will cross-link with each other to form the final flame retardant material 603. This cross-linking may be accomplished by heat the resulting polymer to about 250° C. under an inert environment or reduced pressure.

Typically, larger, bulkier side groups affect polymer properties such as lowering the density, raising the glass transition temperature. Polymers without side groups or with smaller side groups typically have the opposite effect. Other properties can be affected such as melting point, rigid/flexible, soft/hard, etc. Inert side groups means the side groups are less reactive to polymerization, cross-linking, for example linear or branched alkyl chains and aromatic groups, or have other generally reactive functional groups (for example, amines, hydroxyls, and vinyl groups).

Scheme 6:

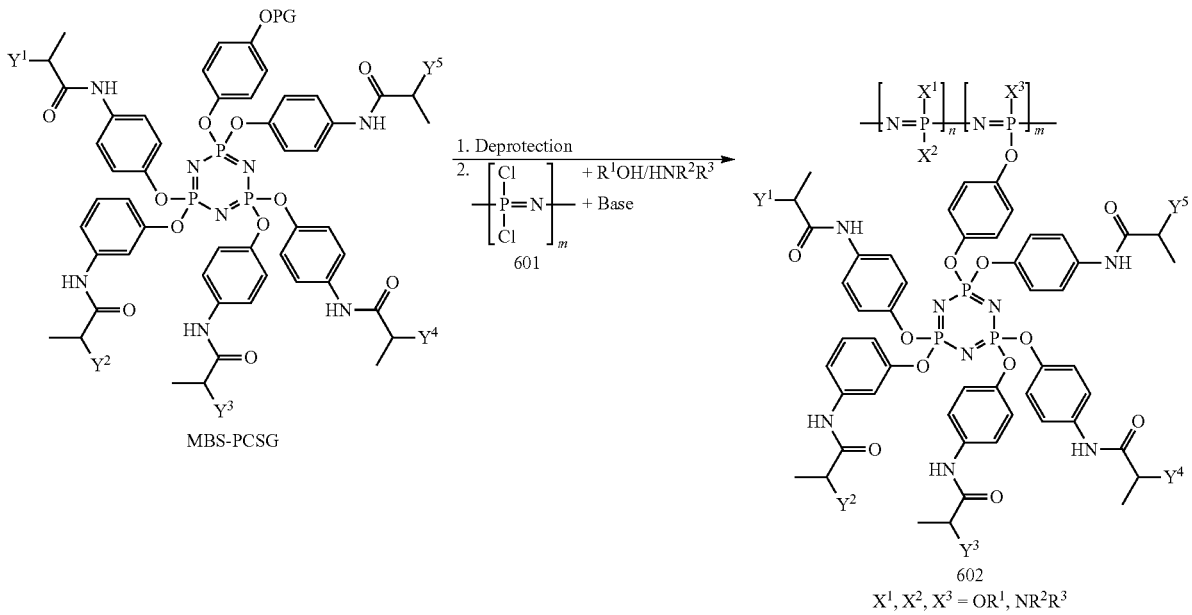

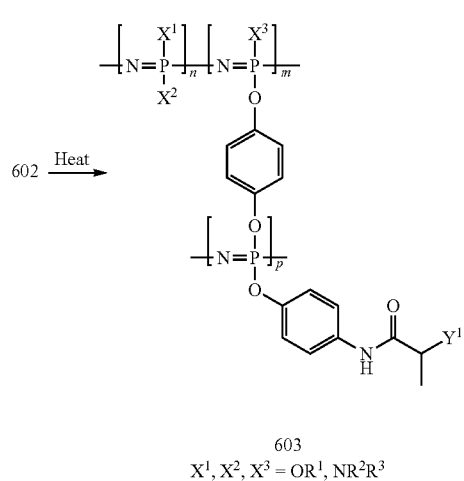

602 →(Heat)

603
$X^1, X^2, X^3 = OR^1, NR^2R^3$

One skilled in the art would appreciate that Y groups ($Y^1$, $Y^2$, $Y^3$, $Y^4$, and $Y^5$) may be the same or different within the phosphazene material. Each Y group can be the same as, or different from, any other Y group (for example $Y^1$ can be the same as, or different from, $Y^2$), and each instance of a Y group, for example $Y^1$, can be the same as, or different from, any other instance of that same Y group (a first instance of $Y^1$ in the phosphazene material can be the same as, or different from, any other instance of $Y^1$ in the phosphazene material). For example, the polymer chains can be grown from a mixture of monomers, i.e., co-monomers reacting from the same mixture at the about the same time. Y can also vary by growing the polymer chains prior to synthesizing the cyclophosphazene ring, and using a mixture of different phenols with varying side chains.

Phosphazenes 602/603 made according to Scheme 6, from an MBS-PCSG, as a representative example, include compounds wherein each of $X^1$, $X^2$, and $X^3$ is independently an —$OR^1$ radical or an —$NR^2R^3$ radical, wherein $R^1$ is $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate; and each of $R^2$ and $R^3$ is independently hydrogen, $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate; m is about 1-200; n is about 1-200; and p is about 1-100.

In an embodiment, a composition is provided. The composition includes a phosphazene represented by formula (I)

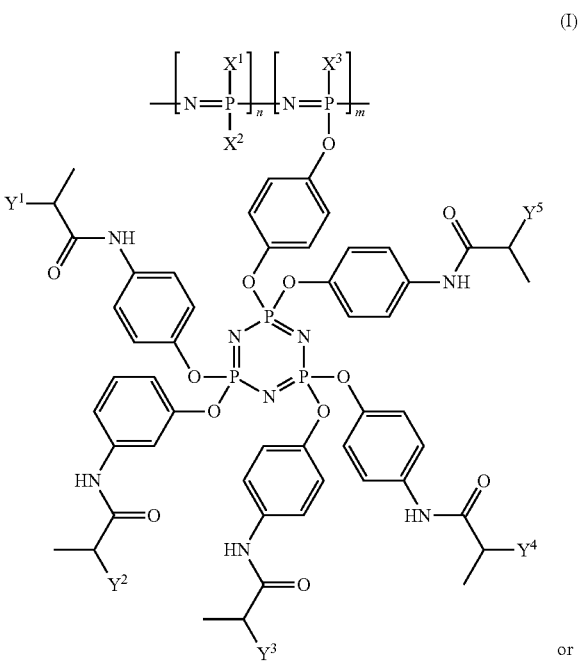

or

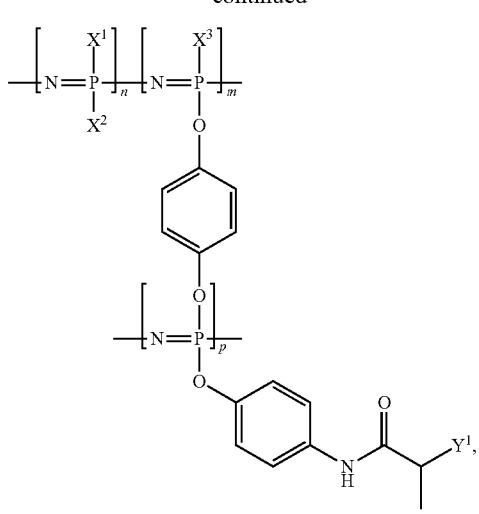

or a combination thereof,
wherein:
each of $Y^1$, $Y^2$, $Y^3$, $Y^4$, and $Y^5$ is a vinyl polymer;
each of $X^1$, $X^2$, and $X^3$ is independently an —$OR^1$ radical or an —$NR^2R^3$ radical, wherein $R^1$ is $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate; and each of $R^2$ and $R^3$ is independently hydrogen, $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate;
m is about 1-200;
n is about 1-200; and
p is about 1-100.

The impact-modified phosphazene materials of the present disclosure include, for example, methacrylate-butadiene-styrene (MBS) copolymers having a polymer chain that optionally includes an organophosphate material. Such materials can be made by polymerizing, for example, a methacrylate monomer material, with other monomers, and optionally an organophosphate monomer. Other monomers include acrylic, styrenic, or other vinylic monomers. For example, the (flame-retardant,) impact-modified phosphazene material may be produced by polymerizing a methacrylate monomer material, a butadiene monomer, a styrene monomer, and optionally an organophosphate monomer. The optional organophosphate monomer may include a phosphorus-containing acrylic monomer, a phosphorus-containing styrenic monomer, or a combination thereof (among other alternatives). Alternatively or additionally, an acrylic, styrenic, or vinylic monomer having flame retardant functionalities (e.g., phosphorus, halogens, etc.) may be suitable for use as a monomer to form a flame-retardant copolymer.

In some embodiments, the vinyl polymer comprises an acrylate monomer, acrylamide monomer, styrenic monomer, or other vinylic monomer, or combination thereof. The vinyl polymer may also be a product of a reaction comprising an acrylate monomer, acrylamide monomer, styrenic monomer, or other vinylic monomer, or combination thereof.

Examples of such monomers include methacrylates, a methacrylamides, butadienes, styrenes, acrylonitriles, iso- cyanates, butyl acrylates, ethylenes, and propylenedienes, or other materials with olefins. Examples of oligomers based on these monomers include methacrylate-butadiene styrene (MBS) material, poly(butadiene styrene) material (PBS), methacrylamide-butadiene styrene material, acrylonitrile-styrene-butyl acrylate (ASA) material, acrylonitrile-butadiene-styrene (ABS) material, methacrylate-acrylonitrile-butadiene-styrene (MABS) material, methacrylate-butadiene (MB) material, and acrylonitrile-ethylene-propylenediene-styrene (AES) material. Other monomers of interest include vinyl-terminated oligomers, xylenols, dimethyl amino styrenes, p-methoxy styrenes, p-methyl styrenes, alpha-methyl styrenes, isoprenes, vinyl naphthalenes, p-chlorostyrenes, vinyl pyridines, diphenyl ethylenes, alkyl methacrylates, propiolactones, propylene sulfides, vinylidene cyanides, and alpha-cyanoacrylates. Preformed polymer blocks may also be used.

In some embodiments, the vinyl polymer is

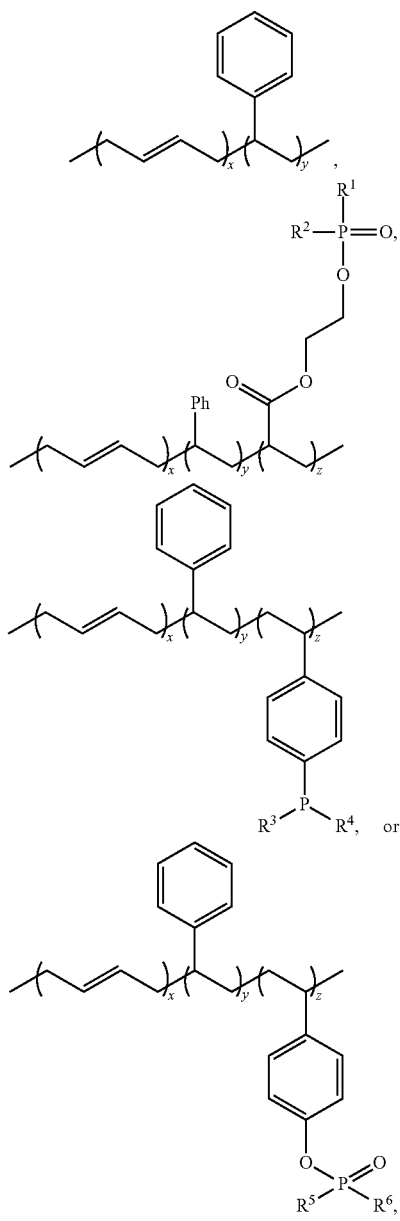

or combinations thereof, wherein:

each of $R^1$, $R^2$, $R^3$, $R^4$, $R^5$, and $R^6$ is independently unsubstituted hydrocarbyl, substituted hydrocarbyl, unsubstituted aryl, substituted aryl, unsubstituted alkoxy, substituted alkoxy, unsubstituted aryloxy, or substituted aryloxy;

x is about 1-12,500;
y is about 1-12,500; and
z is about 1-12,500.

In some embodiments, the vinyl polymer is 1 to 40 wt % of the composition.

In an embodiment and as shown in FIG. 1, a method 100 of making an impact-modified phosphazene material is provided. The method includes reacting a phosphazene material with an acrylamide material to form a functionalized phosphazene material at operation 101; and initiating a polymerization reaction on a reaction mixture comprising the functionalized phosphazene material and one or more monomers to form a first impact-modified phosphazene material at operation 102. The polymerization reaction of operation 102, may, for example, comprise adding an ultraviolet initiator, a thermal initiator, or a radical polymerization initiator.

In addition, operation 102 includes one or more monomers. These monomers include acrylate monomer material, acrylamide monomer material, styrenic monomer material, vinylic monomer material, or a combination thereof. Examples of such monomers include methacrylates, methacrylamides, butadienes, styrenes, acrylonitriles, isocyanates, butyl acrylates, ethylenes, and propylenedienes. Examples of oligomers based on these monomers include methacrylate-butadiene styrene (MBS) material, poly(butadiene styrene) material (PBS), methacrylamide-butadiene styrene material, acrylonitrile-styrene-butyl acrylate (ASA) material, acrylonitrile-butadiene-styrene (ABS) material, methacrylate-acrylonitrile-butadiene-styrene (MABS) material, methacrylate-butadiene (MB) material, and acrylonitrile-ethylene-propylenediene-styrene (AES) material. Other monomers of interest include vinyl-terminated oligomers, xylenols, dimethyl amino styrenes, p-methoxy styrenes, p-methyl styrenes, alpha-methyl styrenes, isoprenes, vinyl naphthalenes, p-chlorostyrenes, vinyl pyridines, diphenyl ethylenes, alkyl methacrylates, propiolactones, propylene sulfides, vinylidene cyanides, and alpha-cyanoacrylates. Preformed polymer blocks may also be used.

At operation 103, the first impact-modified phosphazene material may be reacted with a poly(dichlorophosphazene) monomer material, and a reactant selected from the group consisting of $R^1OH$, $HNR^2R^3$, or a combination thereof, wherein $R^1$ is $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate; and each of $R^2$ and $R^3$ is independently hydrogen, $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate, to form a second impact-modified phosphazene material.

Moreover, the reaction mixture may optionally comprise a phosphorous-containing monomer (i.e., an organophosphate). Such organophosphates may further increase the flame-retardancy of the phosphazene material. The optional organophosphate monomer may include a phosphorus-containing acrylic monomer, a phosphorus-containing styrenic monomer, or a combination thereof (among other alternatives). Alternatively or additionally, an acrylic, styrenic, or vinylic monomer having flame retardant functionalities (e.g., phosphorus, halogens, etc.) may be suitable for use as a monomer to form a flame-retardant copolymer. Examples of the phosphorous-containing monomer include:

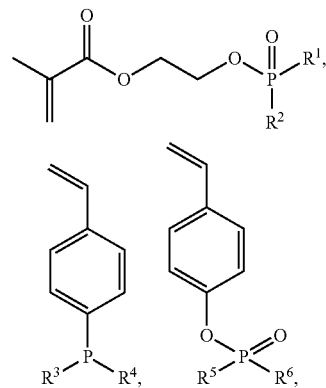

or combinations thereof, wherein:

each of $R^1$, $R^2$, $R^3$, $R^4$, $R^5$, and $R^6$ is independently unsubstituted hydrocarbyl, substituted hydrocarbyl, unsubstituted aryl, substituted aryl, unsubstituted alkoxy, substituted alkoxy, unsubstituted aryloxy, or substituted aryloxy.

The impact-modified phosphazene material may be represented by formula

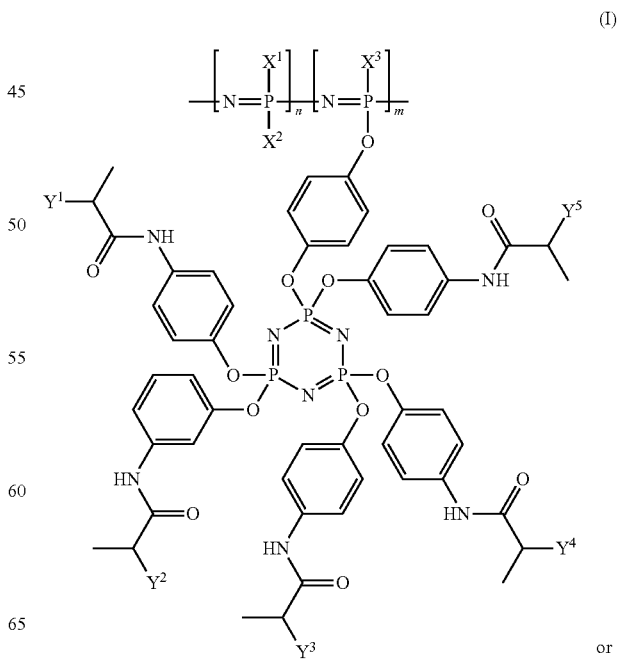

(I)

or

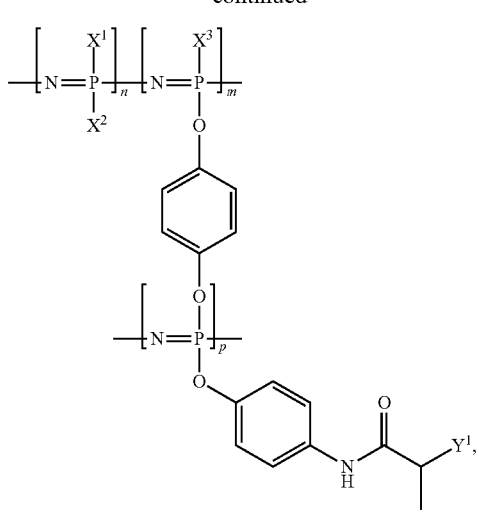

or a combination thereof,
wherein:
each of $Y^1$, $Y^2$, $Y^3$, $Y^4$, and $Y^5$ is a same or different impact modifier material;
each of $X^1$, $X^2$, and $X^3$ is independently an —$OR^1$ radical or an —$NR^2R^3$ radical, wherein $R^1$ is $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate; and each of $R^2$ and $R^3$ is independently hydrogen, $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate;
m is about 1-200;
n is about 1-200; and
p is about 1-100.

Figure 2:
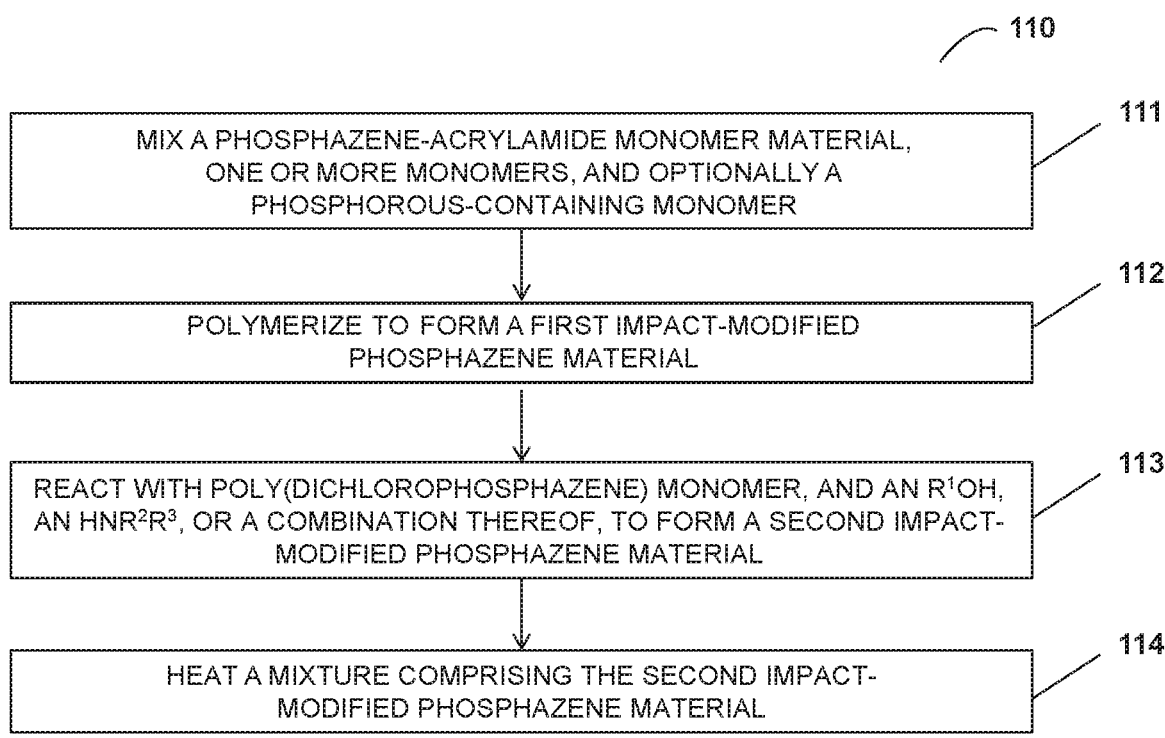
FIG. 2 shows a method of making an impact-modified phosphazene material according to an embodiment.

In an embodiment and as shown in FIG. 2, a method 110 of making an impact-modified polymeric material is provided. The method 110 includes mixing a phosphazene-acrylamide monomer material, one or more monomers, and optionally a phosphorous-containing monomer to form a mixture at operation 111. At operation 112, a polymerization reaction on the mixture forms a first impact-modified phosphazene material. At operation 112, a polymerization reaction may be used to form a (flame-retardant,) impact modified phosphazene material. Moreover, in operation 112, the polymerization includes adding an ultraviolet initiator, a thermal initiator, or a radical polymerization initiator. At operation 111, the phosphazene-acrylamide monomer may be derived from a reaction comprising a phosphazene material with an acrylamide material. At operation 113, the first impact-modified phosphazene material with a poly(dichlorophosphazene) monomer material, and a reactant selected from the group consisting of $R^1OH$, $HNR^2R^3$, or a combination thereof, wherein $R^1$ is $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate; and each of $R^2$ and $R^3$ is independently hydrogen, $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate, to form a second impact-modified phosphazene material. At operation 114, a mixture comprising the second impact-modified phosphazene material may be heated to form a ring-opened impact-modified phosphazene material.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present disclosure, other and further embodiments of the disclosure may be devised without departing from the basic scope thereof, and the scope thereof is determined by the claims that follow.

What is claimed is:

1. A method of forming an impact-modified phosphazene material comprising:
   reacting a phosphazene material with an acrylamide monomer material to form a functionalized phosphazene material;
   initiating a polymerization reaction on a reaction mixture comprising the functionalized phosphazene material and one or more monomers to form a first impact-modified phosphazene material; and
   reacting the first impact-modified phosphazene material with a poly(dichlorophosphazene) monomer material, and a reactant selected from the group consisting of $R^1OH$, $HNR^2R^3$, or a combination thereof, wherein $R^1$ is $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate; and each of $R^2$ and $R^3$ is independently hydrogen, $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate, to form a second impact-modified phosphazene material.

2. The method of claim 1, further comprising heating a mixture comprising the second impact-modified phosphazene material to form a third impact-modified phosphazene material.

3. The method of claim 2, wherein the second impact-modified phosphazene material is represented by formula (I)

(I)

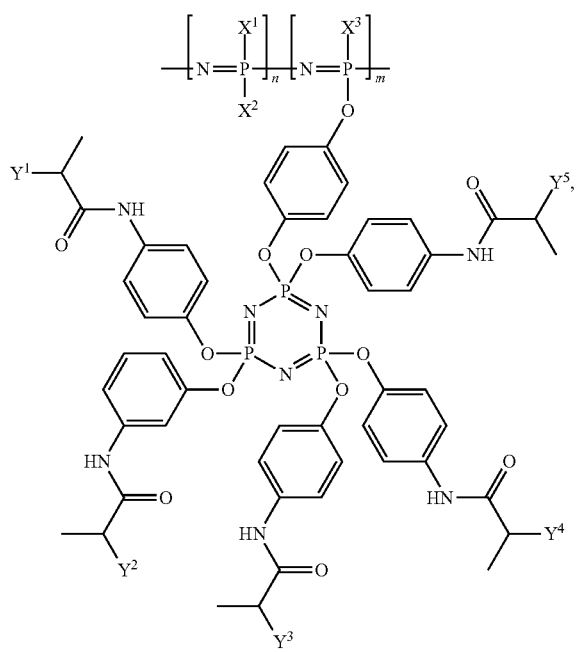

and the third impact-modified phosphazene material is represented by formula (II), (II)

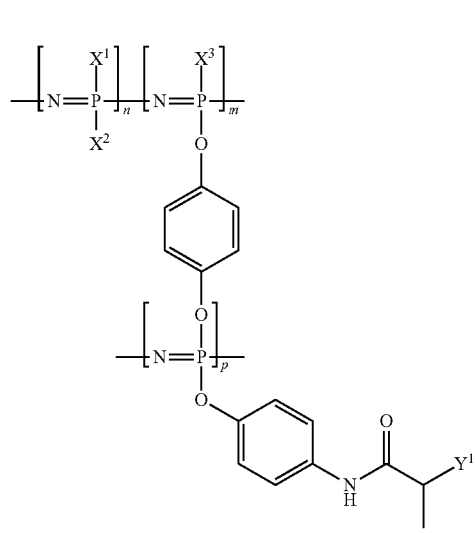

wherein:
each of $Y^1, Y^2, Y^3, Y^4$, and $Y^5$ is independently an impact modifier material;
each of $X^1, X^2$, and $X^3$ is independently an —$OR^1$ radical or an —$NR^2R^3$ radical, wherein $R^1$ is $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate; and each of $R^2$ and $R^3$ is independently hydrogen, $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate;

m is about 1-200;

n is about 1-200; and p is about 1-100.

4. The method of claim 1, wherein the one or more monomers are selected from the group consisting of an acrylate monomer material, acrylamide monomer material, styrenic monomer material, other vinylic monomer material, or a combination thereof.

5. The method of claim 1, wherein the reaction mixture further comprises a phosphorous-containing monomer.

6. The method of claim 5, wherein the phosphorous-containing monomer includes a phosphorous-containing styrenic monomer.

7. The method of claim 5, wherein the phosphorous-containing monomer is

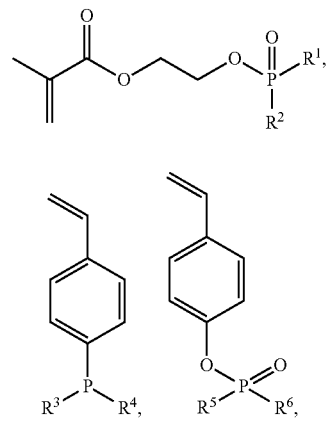

or combinations thereof, wherein:
each of $R^1$, $R^2$, $R^3$, $R^4$, $R^5$, and $R^6$ is independently unsubstituted hydrocarbyl, substituted hydrocarbyl, unsubstituted aryl, substituted aryl, unsubstituted alkoxy, substituted alkoxy, unsubstituted aryloxy, or substituted aryloxy.

8. The method of claim 1, wherein the first impact-modified phosphazene material is represented by the formula:

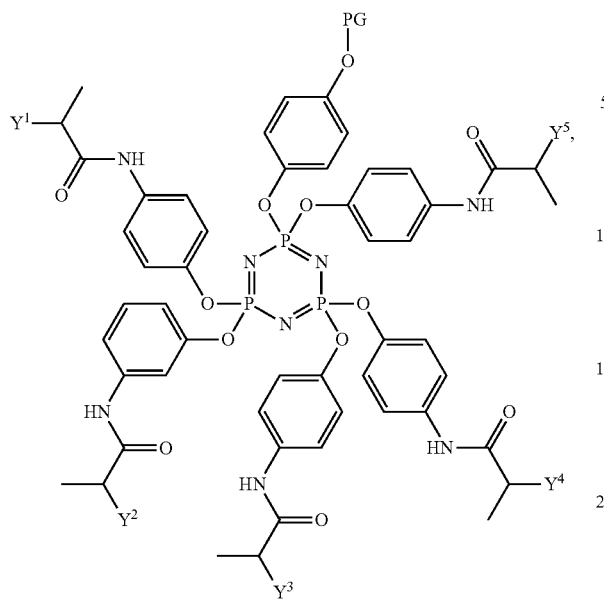

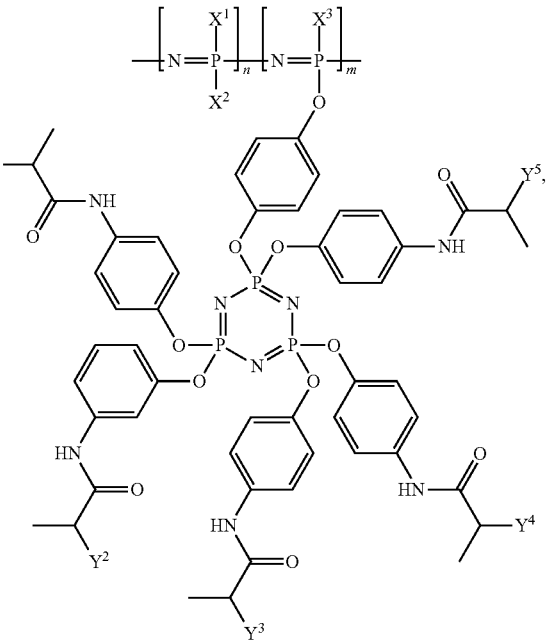

wherein:

PG is a protecting group; and each of $Y^1$, $Y^2$, $Y^3$, $Y^4$, and $Y^5$ is independently an impact modifier material.

9. A method of forming an impact-modified phosphazene material comprising:

reacting a phosphazene material with an acrylamide monomer material to form a functionalized phosphazene material;

initiating a polymerization reaction on a reaction mixture comprising the functionalized phosphazene material and one or more monomers to form a first impact-modified phosphazene material, the one or more monomers selected from the group consisting of an acrylate monomer material, acrylamide monomer material, styrenic monomer material, other vinylic monomer material, or a combination thereof; and reacting the first impact-modified phosphazene material with a poly(dichlorophosphazene) monomer material, and a reactant selected from the group consisting of $R^1OH$, $HNR^2R^3$, or a combination thereof, wherein $R^1$ is $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate; and each of $R^2$ and $R^3$ is independently hydrogen, $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate, to form a second impact-modified phosphazene material.

10. The method of claim 9, further comprising heating a mixture comprising the second impact-modified phosphazene material to form a third impact-modified phosphazene material.

11. The method of claim 10, wherein the second impact-modified phosphazene material is represented by formula (I)

and the third impact-modified phosphazene material is represented by formula (II),

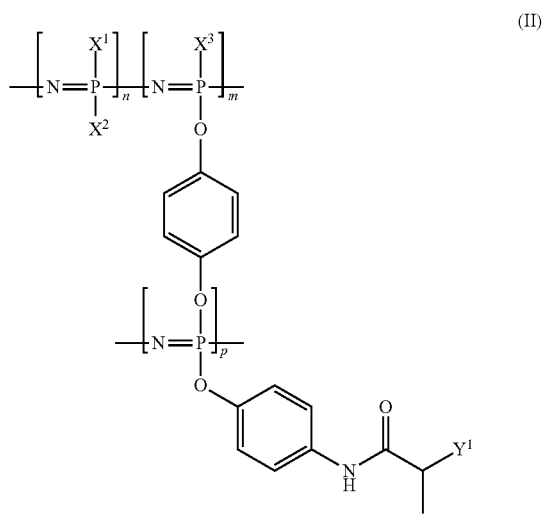

wherein:

each of $Y^1$, $Y^2$, $Y^3$, $Y^4$, and $Y^5$ is independently an impact modifier material;

each of $X^1$, $X^2$, and $X^3$ is independently an —$OR^1$ radical or an —$NR^2R^3$ radical, wherein $R^1$ is $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate; and each of $R^2$ and $R^3$ is independently hydrogen, $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate;

m is about 1-200;
n is about 1-200; and
p is about 1-100.

12. The method of claim 9, wherein the reaction mixture further comprises a phosphorous-containing monomer.

13. The method of claim 8, wherein the first impact-modified phosphazene material is represented by the formula:

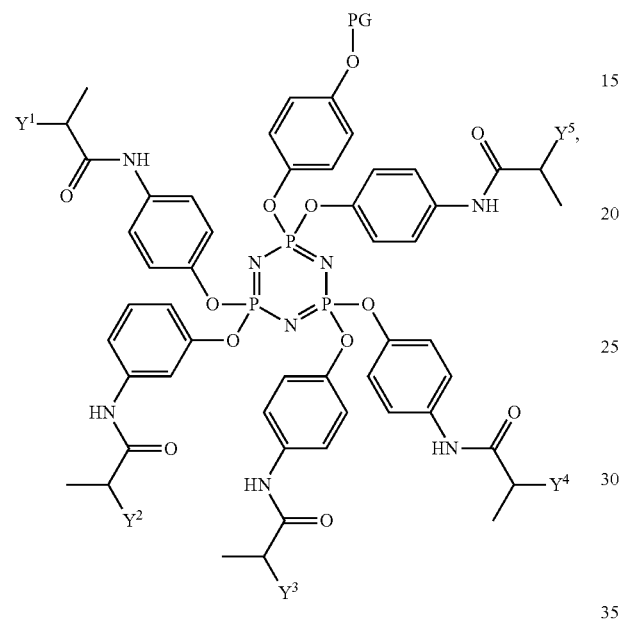

wherein:
PG is a protecting group; and
each of $Y^1$, $Y^2$, $Y^3$, $Y^4$, and $Y^5$ is independently an impact modifier material.

14. A method of forming an impact-modified phosphazene material comprising:
reacting a phosphazene material with an acrylamide monomer material to form a functionalized phosphazene material;
initiating a polymerization reaction on a reaction mixture comprising the functionalized phosphazene material and one or more monomers to form a first impact-modified phosphazene material, the one or more monomers selected from the group consisting of an acrylate monomer material, acrylamide monomer material, styrenic monomer material, other vinylic monomer material, or a combination thereof; and
reacting the first impact-modified phosphazene material with a poly(dichlorophosphazene) monomer material, and a reactant selected from the group consisting of $R^1OH$, $HNR^2R^3$, or a combination thereof, wherein $R^1$ is $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate; and each of $R^2$ and $R^3$ is independently hydrogen, $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate, to form a second impact-modified phosphazene material, wherein the second impact-modified phosphazene material is represented by formula (I)

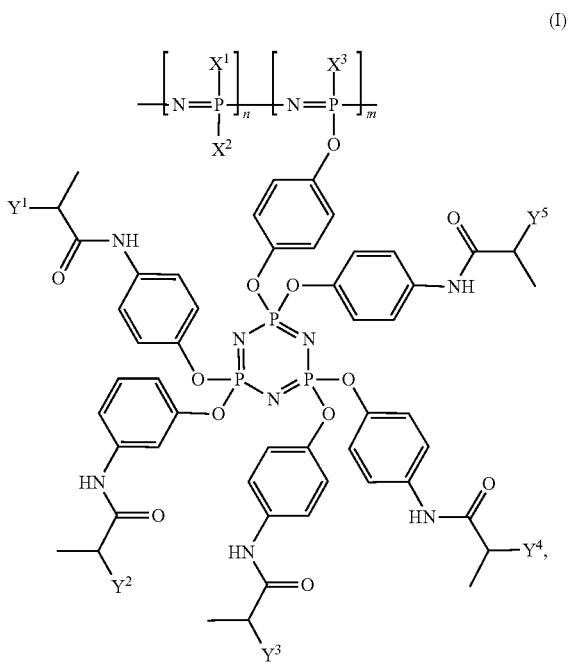

wherein:
each of $Y^1$, $Y^2$, $Y^3$, $Y^4$, and $Y^5$ is independently an impact modifier material;
each of $X^1$, $X^2$, and $X^3$ is independently an —$OR^1$ radical or an —$NR^2R^3$ radical, wherein $R^1$ is $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate; and each of $R^2$ and $R^3$ is independently hydrogen, $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate;
m is about 1-200;
n is about 1-200.

15. The method of claim 14, further comprising heating a mixture comprising the second impact-modified phosphazene material to form a third impact-modified phosphazene material.

16. The method of claim 15, wherein the third impact-modified phosphazene material is represented by formula (II)

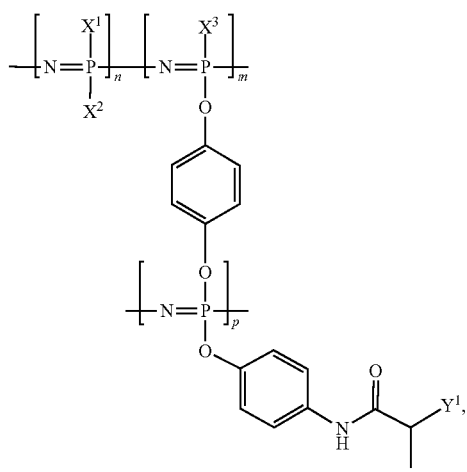

(II)

wherein:
  $Y^1$ is an impact modifier material;
  each of $X^1$, $X^2$, and $X^3$ is independently an —$OR^1$ radical or an —$NR^2R^3$ radical, wherein $R^1$ is $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate; and each of $R^2$ and $R^3$ is independently hydrogen, $C_1$ to $C_{40}$ unsubstituted hydrocarbyl, $C_1$ to $C_{40}$ substituted hydrocarbyl, unsubstituted aryl, substituted aryl, fused aryl, perfluoroalkyl, partially fluorinated alkyl, epoxy, silylcarbyl, siloxyl, anhydride, maleimide, cyanurate, or isocyanurate;
  m is about 1-200;
  n is about 1-200; and
  p is about 1-100.

17. The method of claim 14, wherein the reaction mixture further comprises a phosphorous-containing monomer.

18. The method of claim 14, wherein the first impact-modified phosphazene material is represented by the formula:

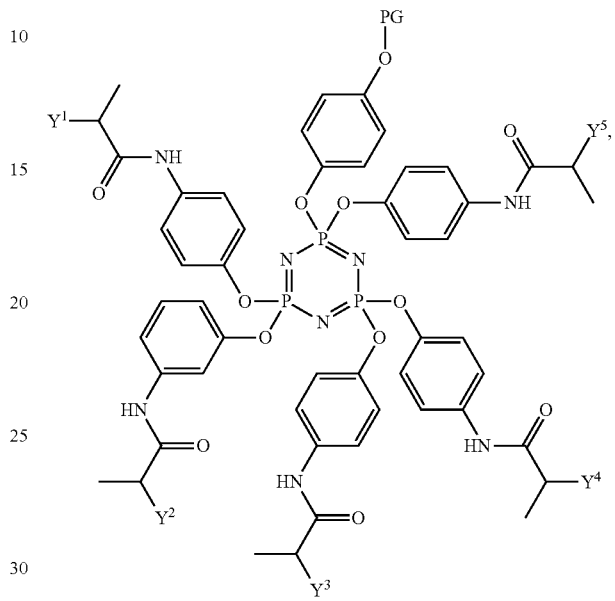

wherein:
  PG is a protecting group; and
  each of $Y^1$, $Y^2$, $Y^3$, $Y^4$, and $Y^5$ is independently an impact modifier material.

* * * * *